United States Patent
Donaghy et al.

(10) Patent No.: US 10,769,102 B2
(45) Date of Patent: Sep. 8, 2020

(54) DISK STORAGE ALLOCATION

(71) Applicant: HEWLETT PACKARD ENTERPRISE DEVELOPMENT LP, Houston, TX (US)

(72) Inventors: Dave Donaghy, Bristol (GB); Josh Whelan, Bristol (GB); John Butt, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 364 days.

(21) Appl. No.: 15/579,838

(22) PCT Filed: Jun. 12, 2015

(86) PCT No.: PCT/US2015/035576
§ 371 (c)(1),
(2) Date: Dec. 5, 2017

(87) PCT Pub. No.: WO2016/200403
PCT Pub. Date: Dec. 15, 2016

(65) Prior Publication Data
US 2018/0165291 A1    Jun. 14, 2018

(51) Int. Cl.
*G06F 16/11* (2019.01)
*G06F 16/174* (2019.01)
(Continued)

(52) U.S. Cl.
CPC .......... *G06F 16/122* (2019.01); *G06F 3/064* (2013.01); *G06F 3/0614* (2013.01); *G06F 3/0641* (2013.01); *G06F 3/0683* (2013.01); *G06F 9/45558* (2013.01); *G06F 11/14* (2013.01); *G06F 16/1752* (2019.01); *G06F 2009/45583* (2013.01)

(58) Field of Classification Search
CPC .......................... G06F 16/122; G06F 16/1752
See application file for complete search history.

(56) References Cited

U.S. PATENT DOCUMENTS 7,778,960 B1 * 8/2010 Chatterjee ............. G06F 16/214
707/609
8,843,459 B1    9/2014 Aston et al.
(Continued)

FOREIGN PATENT DOCUMENTS

WO    WO-2012178032 A1    12/2012

OTHER PUBLICATIONS

Ford, D. et al., "Availability in Globally Distributed Storage Systems," (Research Paper), Sep. 21, 2010, 14 pages, https://www.usenix.org/legacy/event/osdi10/tech/full_papers/Ford.pdf.
(Continued)

*Primary Examiner* — Marc S Somers
(74) *Attorney, Agent, or Firm* — Trop, Pruner & Hu, P.C.

(57) ABSTRACT

According to an example, to allocate disk storage space, a request to store a new data chunk in a container is received. For a list of available containers, an exposure count for the container is fetched in the event that a container comprises a data chunk from a same source as the new data chunk. An optimal container to store the new data chunk is determined, and in the event that an exposure count of the optimal container is less than an exposure count limit, the new data chunk in the optimal container is stored.

20 Claims, 3 Drawing Sheets

(51) Int. Cl.
*G06F 3/06* (2006.01)
*G06F 11/14* (2006.01)
*G06F 9/455* (2018.01)

(56) References Cited

U.S. PATENT DOCUMENTS

| | | |
|---|---|---|
| 8,972,672 B1 * | 3/2015 | Wallace ................ G06F 3/0641 |
| | | 707/693 |
| 2002/0111699 A1 | 8/2002 | Melli et al. |
| 2003/0149835 A1 | 8/2003 | Allen et al. |
| 2006/0010150 A1 * | 1/2006 | Shaath .................. G06F 16/125 |
| 2006/0248273 A1 | 11/2006 | Jernigan et al. |
| 2007/0130232 A1 * | 6/2007 | Therrien ............. G06F 11/1471 |
| 2010/0169454 A1 * | 7/2010 | Tanimura ............ H04L 67/1097 |
| | | 709/217 |
| 2010/0299490 A1 | 11/2010 | Attarde et al. |
| 2012/0173838 A1 | 7/2012 | Noll et al. |
| 2012/0284317 A1 | 11/2012 | Dalton |
| 2014/0122795 A1 | 5/2014 | Chambliss |
| 2014/0317065 A1 | 10/2014 | Barrus |

OTHER PUBLICATIONS

International Search Report & Written Opinion received in PCT Application No. PCT/US2015/035576, dated Feb. 29, 2016, 10 pages.

\* cited by examiner

DISK STORAGE ALLOCATION

BACKGROUND

Computing systems, devices, and electronic components in general may utilize content in the form of digital files. Systems may create files, store files, or receive files, as examples. A user may retain or have access to a large number of files stored across a multitude of devices, systems, ecosystems, accounts, and/or platforms. In some systems, a file may be written and/or stored in separate parts or chunks. Failure of a single disk component at either the hardware or software level may have a significant impact on a user.

DETAILED DESCRIPTION

Figure 1:
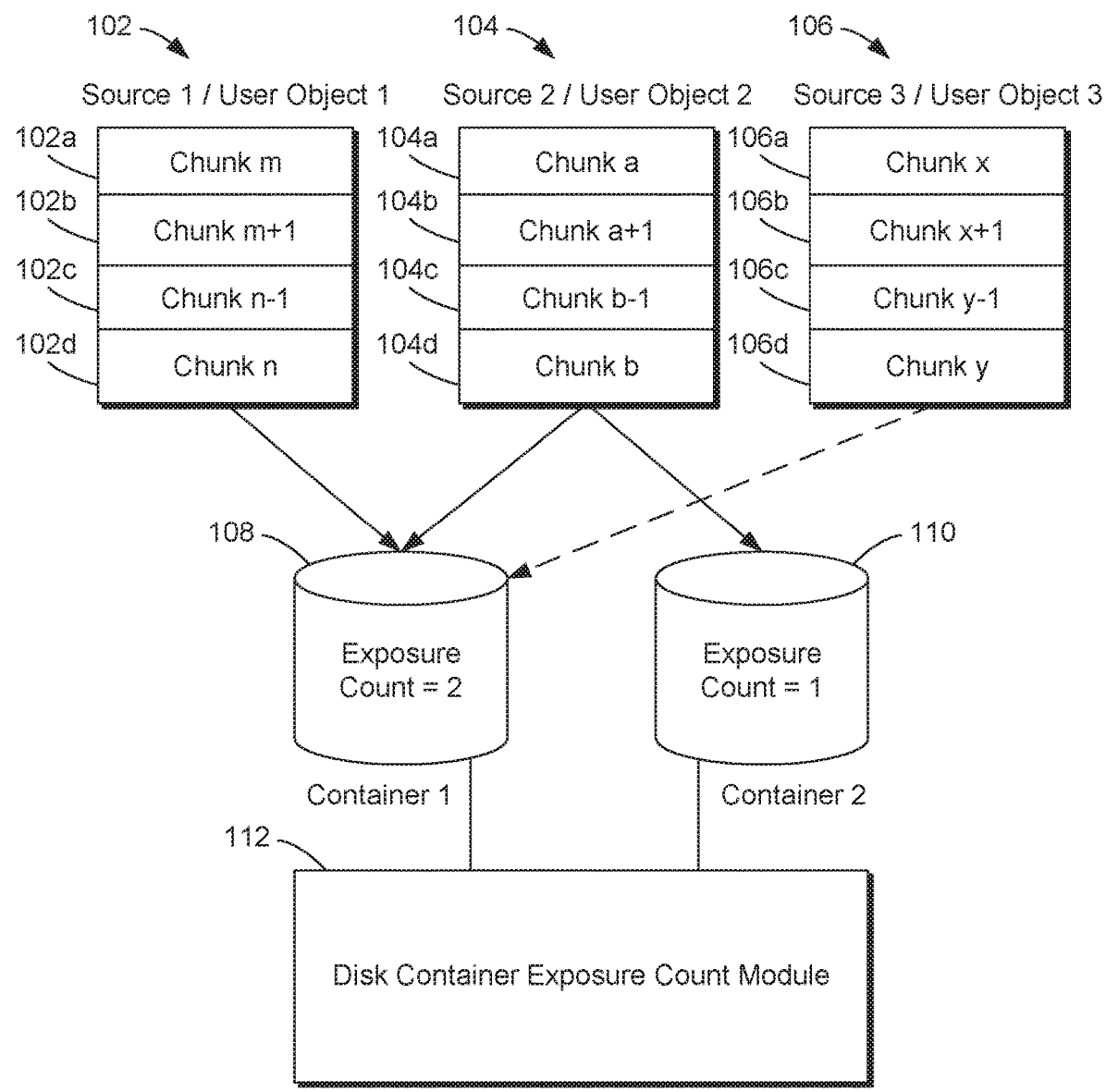
FIG. 1 illustrates a disk container exposure count module and data storage containers including an exposure count, according to an example of the present disclosure.

Various examples described below provide for allocating disk storage space on a drive or drives according to, for example, an allocation policy. An allocation policy may specify that a specific disk container or other storage element on a disk may only store data related to a limited number of data items or data chunks, such that if the container were to fail, the "exposure" or impact on a user would be minimized.

Generally, computer systems include storage devices to store parts of a data item or entity such as a file, database table, memory page, communication stream, or other data for subsequent retrieval. In some examples, data items may be written and/or stored as separate parts in multiple storage locations, e.g., as data chunks. In some systems, the number of data items stored across a disk or disks may number in the billions, and may be stored across a complex configuration of hardware and software elements.

Data may also be de-duplicated or compressed to save disk storage space. For example, a single chunk of data that is replicated across multiple files may be stored only once, with the associated files or data items having a pointer or reference to the storage location of the common data chunk in general, various techniques may be used on a disk system, including across multiple disks, to optimize data storage, read and write times, efficiency, and other metrics affecting performance, reliability, and other factors.

While such techniques improve the overall user and management experience and lower storage costs, they may increase the impact that failure of a disk, component, or disk sector could have on the overall system. For example, a disk may store a large number of data chunks in a single container on the disk. A container may be, in an example, an internal file used by a disk storage system to store data.

Data chunks in a container may relate to or "map" to a larger number of data items, particularly in the case where the data chunks are stored once and mapped to multiple data items in a one-to-many or even many-to-many relationship or dependencies. If, for example, the disk sector or disk area storing that container were to fail, e.g., such as a hardware failure or a software-level corruption, the large number of data items storing data chunks in that container could be damaged, unrepairable, or unrecoverable based on a failure of the single container.

A user or administrator of a system may desire to minimize the number of data items that can be lost should a single container fail, corrupt, or otherwise be unreadable or unrecoverable by limiting the number of data chunks and/or data items that may be written to a single container. Such an exposure count limit may be expressed as an absolute number, e.g., only one item may be lost from a single failure, or may expressed as a proportion or percentage, e.g., only 10% of data items stored on a disk may be lost from a single failure.

In another example, a combination of criteria may be used to determine an exposure count limit, such as that only 10% of items, but in no case no more than 5 items, may be lost due to a single failure. In other examples, the limit may be adaptive in nature based on, for example, whether data is stored on a personal or enterprise system, whether data is classified as mission critical, whether data is stored on one disk or across many disks, or whether data is stored on a system enabled with a redundant array of inexpensive disks or RAID.

In an example of allocating storage on a disk or disks to minimize the impact of data storage failure, when writing a new data chunk to a disk, a count of items stored in a container, e.g., an exposure count, is determined for each container that is available or accessible to store the new data chunk. An optimal container, e.g., a container with the lowest exposure count, is then determined such that new data may be stored in a container that would minimize impact on a user should the container fail.

In such an example, in the event that the exposure count of the optimal container is less than an exposure count limit set in the allocation policy, the new data chunk may be stored to the container with the lowest exposure count, e.g., the optimal container. If the exposure count is equal to or greater than the exposure count limit in the allocation policy, a new container may be created and the new data chunk may be stored in the new container.

FIG. 1 illustrates a disk container exposure count module and data storage containers including an exposure count, according to an example of the present disclosure.

A disk storage system (hereinafter simply a "disk") may comprise a container or containers, e.g., containers 108 and 110, which may be internal files stored on the disk for purposes of housing a data item or items, or a data chunk or data chunks. For example, a disk may store data items or files 102, 104, and 106, which may be comprised of data chunks 102$a$-$d$, 104$a$-$d$, and 106$a$-$d$, respectively.

Disk container exposure count module 112 may contain instructions to store the data chunks 102$a$-$d$, 104$a$-$d$, and 106$a$-$d$ across containers on the disk, including on, but not limited to, containers 108 and 110. The instructions stored in disk container exposure count module 112 are discussed below in more detail with respect to FIGS. 2 and 3.

In the example of FIG. 1, an allocation policy for the disk, or more generally for a system or systems housing or accessing the disk of FIG. 1, may indicate that the maximum number of data items exposed to a container is two. More specifically, the allocation policy controlling the disk of FIG. 1 may indicate that once chunks from two data items, e.g., two sources, are stored in a single container, attempts to store data chunks from a third data item will result in an instruction to store the data chunks of the third item in a different container that has not exceeded the exposure count limit of the allocation policy.

For example, in FIG. 1, data chunks 102a-d and 104a-d may be stored in container 1, resulting in an exposure count of 2 for container 1. However, the allocation policy of the disk shown in FIG. 1 would then store data chunks 106a-d in a different container, e.g., container 2, or a new container if no containers that satisfied the allocation policy exposure count limit were available.

Figure 2:
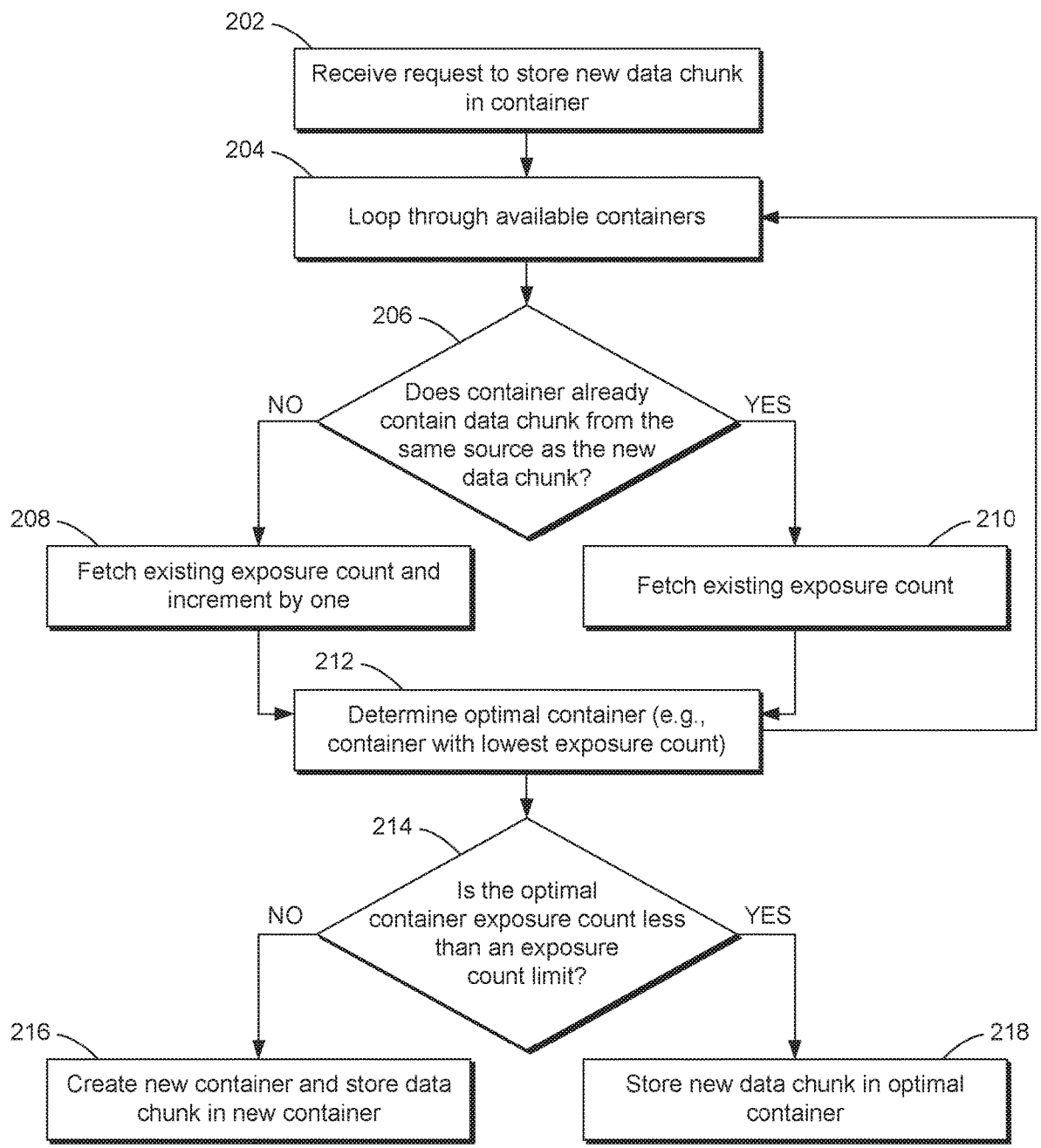
FIG. 2 illustrates a flowchart of storing a new data chunk in a container, according to an example of the present disclosure.

FIG. 2 illustrates a flowchart of storing a new data chunk in a container, according to an example of the present disclosure.

In block 202, a request to store a new data chunk (or chunks) in a container is received. The request may originate from an operating system, disk system, disk controller, software program or application, network communication, user input, or other system, application, or protocol capable of instructing a disk to write data.

In block 204, a loop through containers available for storage on the disk may be commenced. For each container, in block 206, a determination may be made as to whether the container already stores a data chunk from the same data item or source as the new data chunk to be written to the disk.

In block 210, if the container already stores a data chunk from the same data item or source as the new data chunk to be written to the disk, the existing exposure count for the container is fetched. In such cases, the exposure count of the container would not be increased by storing the new data chunk to the container, since a data chunk from the data item is already stored in the container and thus the data item is already exposed.

In block 208, if the container does not already store a data chunk from the same data item or source as the new data chunk to be written to the disk, the existing exposure count for the container is fetched and incremented by one. In such an example, storing the new data chunk to the container would increase the exposure count of the container, since no data from that data item has been stored in the container.

In some examples, the flow of blocks 204 through 210 may be executed each time a data chunk is to be stored, or at a particular interval. In some examples, the exposure counts may be stored on a disk system, while in other examples the exposure counts may be stored in an indexed database.

In block 212, an optimal container to store the new data chunk is determined. In some examples, the optimal container may be the container on the disk with lowest exposure count in examples where multiple containers have equally low exposure counts, other factors may influence or determine which of those containers are selected, such as disk storage optimization techniques.

In block 214, a determination is made as to whether the optimal container has an exposure count that is less than the exposure count limit set in the allocation policy. In the event that the exposure count of the container is less than the exposure count limit, the new data chunk may be stored in the optimal container. In the event that the exposure count is equal to or greater than the exposure count limit, a new container may be created, and the new data chunk may be stored in the new container.

Figure 3:
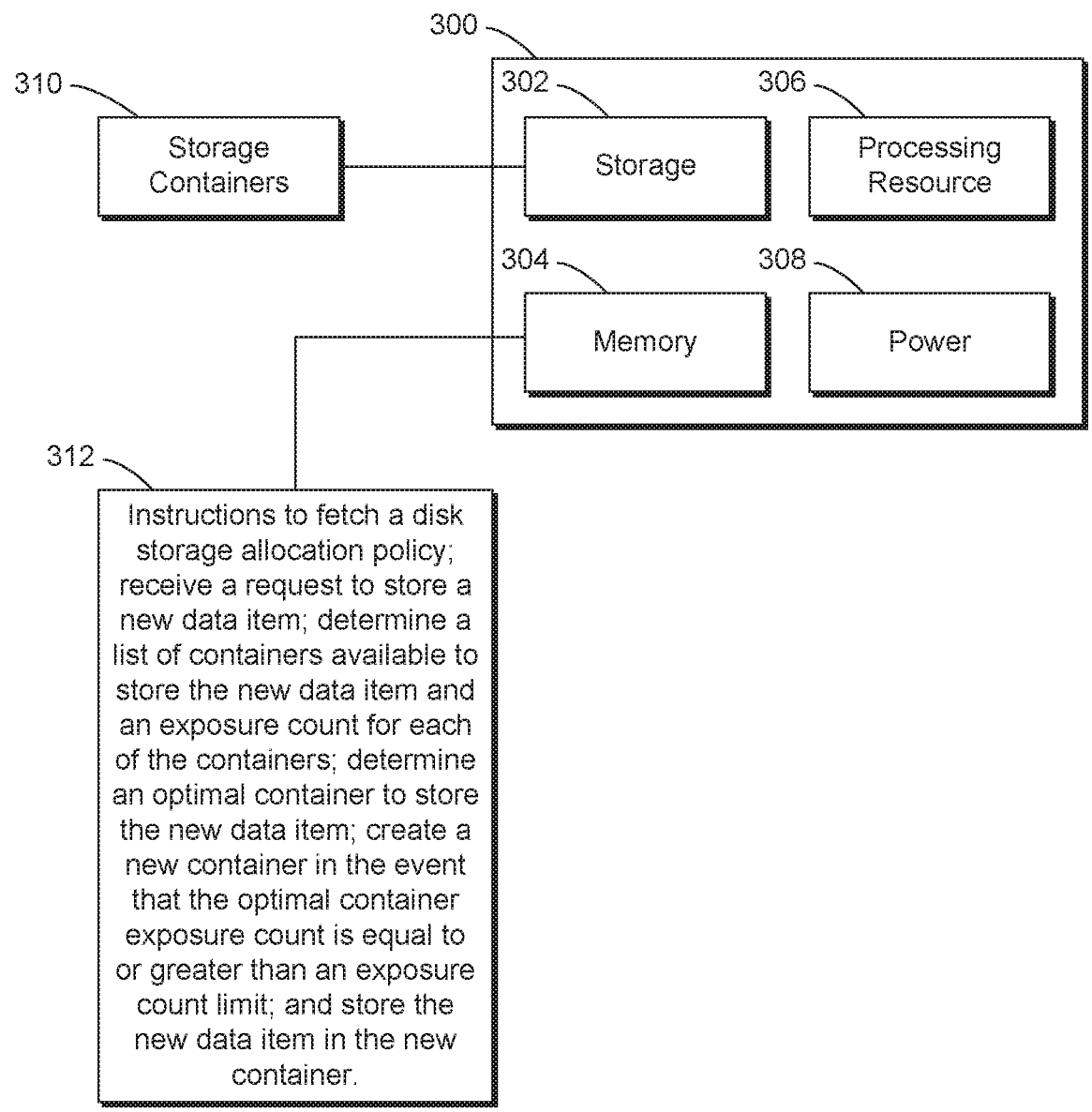
FIG. 3 illustrates a schematic representation of a computing device that may be used as a platform for storing a new data chunk in a container, according to an example of the present disclosure.

FIG. 3 illustrates a schematic representation of a computing device that may be used as a platform for storing a new data chunk in a container, according to an example of the present disclosure.

In an example, device 300 comprises a storage device or storage controller 302, memory (or machine-readable medium) 304, processing resource or CPU 306, and power source 308, all of which may be coupled by a bus or other interconnect. In some examples, device 300 may also comprise a computer readable medium, which may comprise an operating system, network applications, and/or disk storage allocation module.

Some or all of the operations set forth in the figures may be contained as machine-readable instructions as a utility, program, or subprogram in any desired computer readable storage medium, or embedded on hardware. In addition, the operations may be embodied by machine-readable instructions. For example, they may exist as machine-readable instructions in source code, object code, executable code, or other formats. The computer readable medium may also store other machine-readable instructions, including instructions downloaded from a network or the internet.

The computer-readable medium may also store machine-readable instructions that may perform basic tasks such as recognizing input from input devices, such as a keyboard or a keypad; sending output to a display; keeping track of files and directories on a computer readable medium; and managing traffic on a bus. The network applications may include various components for establishing and maintaining network connections, such as machine readable instructions for implementing communication protocols including but not limited to TCP/IP, HTTP, HTTPS, Ethernet, USB, and FireWire.

In an example where the device of FIG. 3 is a device for allocating disk storage, device 300 may include instructions, e.g., instructions 312, to carry out the steps of FIG. 2.

In another example, instructions 312 may fetch a disk storage allocation policy, which as discussed above may include an exposure count limit for the disk. Instructions 312 may receive a request to store a new data item, such as from an operating system, disk system, disk controller, software program or application, network communication, user input, or other system, application, or protocol capable of instructing a disk to write data.

Instructions 312 may then determine a list of containers available to store the new data item and an exposure count for each of the containers. An optimal container to store the new data item may then be determined.

A new container may be created on the disk, e.g., new storage container 310, in the event that the optimal container exposure count is equal to or greater than an exposure count limit. The new data item or data chunks may then be stored in the new container.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method comprising:
receiving, in a system comprising a hardware processor, a request to store a new data chunk in a container;
identifying, by the system, available containers;
in response to a first container of the available containers storing a data chunk from a same source as the new data chunk, fetching, by the system, a first exposure count for the first container and not increasing the first exposure count based on the new data chunk;

in response to a second container of the available containers not storing a data chunk from the same source, fetching, by the system, a second exposure count for the second container and increasing the second exposure count based on the new data chunk;

determining, by the system, an optimal container of the available containers to store the new data chunk based on comparing exposure counts, including the first exposure count and the increased second exposure count, of the available containers; and in response to an exposure count of the optimal container being less than an exposure count limit, storing the new data chunk in the optimal container.

2. The method of claim 1, wherein the first exposure count is based on a quantity of sources for which the first container stores data chunks, and the second exposure count is based on a quantity of sources for which the second container stores data chunks.

3. The method of claim 2, wherein the sources for which the first container stores data chunks are first files, and the sources for which the second container stores data chunks are second files.

4. The method of claim 1, comprising determining, by the system, the exposure count limit by accessing a disk drive storage allocation policy.

5. The method of claim 1, wherein the determining of the optimal container to store the new data chunk comprises identifying which of the available containers has a lowest exposure count of the exposure counts that are compared.

6. The method of claim 1, wherein information of the available containers is stored in an indexed database.

7. The method of claim 1, wherein each container of the available containers is a file stored in a storage system.

8. The method of claim 1, further comprising:
in response to the exposure count of the optimal container being greater than or equal to the exposure count limit, creating, by the system, a new container, and storing the new data chunk in the new container.

9. A system comprising:
a processor;
a non-transitory storage medium storing instructions executable on the processor to:
receive a given data chunk of a file that is divided into a plurality of data chunks;
fetch exposure counts for respective containers of a plurality of containers from a database;
in response to determining that a first container of the plurality of containers stores a data chunk for the file, decline to increase a first exposure count for the first container based on the given data chunk;
in response to determining that a second container of the plurality of containers does not store a data chunk for the file, increase a second exposure count for the second container based on the given data chunk;
determine an optimal container from the plurality of containers to store the given data chunk based on the first exposure count and the increased second exposure count; and
cause storing of the given data chunk in the optimal container in response to an exposure count of the optimal container satisfying a criterion.

10. The system of claim 9, wherein the optimal container is an existing container of the plurality of containers, and the exposure count of the optimal container is less than an exposure count maximum value, wherein the criterion is satisfied when the exposure count of the optimal container is less than the exposure count maximum value.

11. The system of claim 10, wherein the exposure count maximum value is based on a maximum number of files that are permitted to depend on a single container.

12. The system of claim 10, wherein the exposure count maximum value is based on a percentage of files in a storage system that are permitted to depend on a single container.

13. The system of claim 9, wherein the instructions are executable on the processor to, in response to the exposure count of the optimal container not satisfying the criterion, create a new container, and store the given data chunk in the new container.

14. The system of claim 9, wherein the instructions are executable on the processor to determine the optimal container based on comparing the first exposure count and the increased second exposure count.

15. The system of claim 14, wherein the instructions are executable to determine the optimal container based on comparing the first exposure count, the increased second exposure count, and an exposure count of another container of the plurality of containers.

16. A non-transitory computer readable storage medium comprising instructions that upon execution cause a system to:
receive a request to store a new data chunk of a source in a container in a storage system;
identify available containers available to store the new data chunk;
retrieve exposure counts for respective containers of the available containers;
in response to determining that a first container of the available containers stores a data chunk for the source, decline to increase a first exposure count for the first container based on the new data chunk;
in response to determining that a second container of the available containers does not store a data chunk for the source, increase a second exposure count for the second container based on the new data chunk;
determine an optimal container to store the new data chunk based on comparing the first exposure count and the increased second exposure count; and
in response to the optimal container having an exposure count greater than or equal to an exposure count limit, create a new container and store the new data chunk in the new container.

17. The non-transitory computer readable storage medium of claim 16, wherein the instructions upon execution cause the system to store the new data chunk in the optimal container in response to the exposure count of the optimal container being less than the exposure count limit.

18. The non-transitory computer readable storage medium of claim 16, wherein the optimal container is the container with a lowest exposure count of the available containers.

19. The non-transitory computer readable storage medium of claim 16, wherein each container of the available containers is a file stored in the storage system.

20. The non-transitory computer readable storage medium of claim 19, wherein the first container stores data chunks for first files, and the second container stores data chunks for second files.

* * * * *